(12) United States Patent
Shang (10) Patent No.: US 11,595,356 B1
(45) Date of Patent: Feb. 28, 2023

(54) METHOD, APPARATUS, DEVICE AND STORAGE MEDIUM FOR PROCESSING NETWORK REQUEST

(71) Applicant: BEIJING BYTEDANCE NETWORK TECHNOLOGY CO., LTD., Beijing (CN)

(72) Inventor: Chaoyang Shang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/717,981

(22) Filed: Apr. 11, 2022

(30) Foreign Application Priority Data

Dec. 24, 2021 (CN) .......................... 202111597599.8

(51) Int. Cl.
| | |
|---|---|
| *H04L 29/06* | (2006.01) |
| *H04L 9/40* | (2022.01) |
| *H04L 61/59* | (2022.01) |
| *H04L 61/4511* | (2022.01) |

(52) U.S. Cl.
CPC ...... *H04L 63/0281* (2013.01); *H04L 61/4511* (2022.05); *H04L 61/59* (2022.05); *H04L 63/0236* (2013.01)

(58) Field of Classification Search
CPC . H04L 63/0281; H04L 61/4511; H04L 61/59; H04L 63/0236
See application file for complete search history.

(56) References Cited

U.S. PATENT DOCUMENTS

| | | | |
|---|---|---|---|
| 6,822,955 B1 * | 11/2004 | Brothers ................. | H04L 61/10 370/389 |
| 7,512,708 B2 * | 3/2009 | Read ....................... | H04L 61/00 709/245 |
| 10,972,436 B1 * | 4/2021 | Simanel ................ | H04L 67/145 |

(Continued)

FOREIGN PATENT DOCUMENTS

WO  WO 2022056996 A1 * 3/2022 ......... H04L 63/0236

*Primary Examiner* — Joseph P Hirl
*Assistant Examiner* — Ka Shan Choy (57) ABSTRACT

Embodiments of the present disclosure disclose a method, apparatus, device, and storage medium for processing a network request. The method comprises: activating a domain name server proxy based on local socket service in a preset application; in accordance with a determination that the preset application invokes a preset connect function, acquiring the preset connect function and replacing a destination file path in the preset connect function with a target file path corresponding to the domain name server proxy to establish a connection between the preset application and the domain name server proxy, wherein the target file path is pre-written in the preset application; receiving via the domain name server proxy a network request from the preset application, and parsing a domain name of the network request, and determining a first processing way of the network request based on a result of the parsing of the domain name. With the above technical solution, the domain name server proxy is implemented inside the application, and all network requests are taken over from the parsing of the domain name, which facilitates comprehensive detection and control of network traffic and avoidance of omissions.

20 Claims, 4 Drawing Sheets

(56) References Cited

U.S. PATENT DOCUMENTS

| | | | |
|---|---|---|---|
| 2007/0180139 A1* | 8/2007 | Oguchi | H04L 61/2582 709/238 |
| 2011/0154477 A1* | 6/2011 | Parla | H04L 63/0272 726/15 |
| 2016/0219013 A1* | 7/2016 | Lapidous | H04L 63/0272 |

* cited by examiner

METHOD, APPARATUS, DEVICE AND STORAGE MEDIUM FOR PROCESSING NETWORK REQUEST

FIELD

Embodiments of the present disclosure relate to the computer technical field, and more specifically, to a method, apparatus, device and storage medium for processing a network request.

BACKGROUND

With the rapid development of the Internet technology, many applications have networking capabilities.

At present, there are a large number of ways for applications to make network requests, for example using a system socket, using a third-party library or directly using an underlying network interface of a system, etc. The diversification of network request methods makes it difficult to cover all network requests when it is necessary to control network traffic and other related processing.

SUMMARY

Embodiments of the present disclosure provide a method, apparatus, storage medium and device for processing a network request, which may optimize existing solutions for processing a network request.

In a first aspect, the embodiments of the present disclosure provide a method for processing a network request, comprising: activating a domain name server proxy based on a local socket service in a preset application; in accordance with a determination that the preset application invokes a preset connect function, acquiring the preset connect function and replacing a destination file path in the preset connect function with a target file path corresponding to the domain name server proxy to establish a connection between the preset application and the domain name server proxy, wherein the target file path is pre-written in the preset application; receiving via the domain name server proxy a network request from the preset application, and parsing a domain name of the network request, and determining a first processing way of the network request based on a result of the parsing of the domain name.

In a second aspect, the embodiments of the present disclosure provide an apparatus for processing a network request, comprising: a domain name server proxy activating module configured to activate a domain name server proxy based on a local socket service in a preset application; a connecting module configured to, in accordance with a determination that the preset application invokes a preset connect function, acquire the preset connect function and replace a destination file path in the preset connect function with a target file path corresponding to the domain name server proxy to establish a connection between the preset application and the domain name server proxy, wherein the target file path is pre-written in the preset application; a processing module configured to receive via the domain name server proxy a network request from the preset application, and parse a domain name of the network request, and determine a first processing way of the network request based on a result of the parsing of the domain name.

In a third aspect, the embodiments of the present disclosure provide an electronic device, comprising: a memory, a processor and a computer program stored on the memory and capable of running on the processor, the computer program, when executed by the processor, implementing the method for processing a network request as provided by the embodiments of the present disclosure.

In a fourth aspect, the embodiments of the present disclosure provide a computer readable storage medium, with a computer program stored thereon, the program, when executed by a processor, implementing the method for processing a network request as provided by the embodiments of the present disclosure.

With the solution for processing a network request provided in the embodiments of the present disclosure, a domain name server proxy based on a local socket service is activated in the preset application; and in accordance with a determination that the preset application invokes a preset connect function, the preset connect function is acquired, and a destination file path in the preset connection function is replaced with a target file path corresponding to the domain name server proxy to establish a connection between the preset application and the domain name server proxy, wherein the target file path is written in the preset application in advance; and a network request from the preset application is received via the domain name server proxy, a domain name of the network request is parsed, and a first processing way of the network request is determined based on a result of the parsing of the domain name. With the above technical solution, the domain name server proxy may be implemented inside the application, and all network requests may be taken over from the stage of the parsing of the domain name, which facilitates comprehensive detection and control of network traffic and avoidance of omissions.

DETAILED DESCRIPTION OF IMPLEMENTATIONS

Embodiments of the present disclosure will be described in more detail with reference to the accompanying drawings, in which some embodiments of the present disclosure have been illustrated. However, it should be understood that the present disclosure can be implemented in various ways, and thus should not be construed to be limited to embodiments disclosed herein. On the contrary, these embodiments are provided for the thorough and complete understanding of the present disclosure. It should be understood that the drawings and embodiments of the present disclosure are merely for the illustration propose and not limiting the protection scope of the present disclosure.

It should be understood that various steps described in method embodiments of the present disclosure may be performed in a different order and/or in parallel. In addition, the method embodiments may comprise an additional step and/or omit a step which is shown. The scope of the present disclosure is not limited in this regard.

The term "comprise" and its variants used here are to be read as open terms that mean "include, but is not limited to." The term "based on" is to be read as "based at least in part on". The term "one embodiment" are to be read as "at least one embodiment." The term "another embodiment" is to be read as "at least one other embodiment." The term "some embodiments" are to be read as "at least some embodiments." Other definitions will be presented in the description below.

Note that the concepts "first," "second" and so on mentioned in the present disclosure are only for differentiating different apparatuses, modules or units rather than limiting the order or mutual dependency of functions performed by these apparatuses, modules or units.

Note that the modifications "one" and "a plurality" mentioned in the present disclosure are illustrative rather than limiting, and those skilled in the art should understand that unless otherwise specified, they should be understood as "one or more."

The names of messages or information exchanged between multiple devices in the embodiments of the present disclosure are for illustrative purposes only, and are not used to limit the scope of these messages or information.

Each embodiment among the following embodiments provides both optional features and examples, and various features described in the embodiments may be combined to form multiple optional solutions, and each numbered embodiment should not be regarded as only one technical solution.

Figure 1:
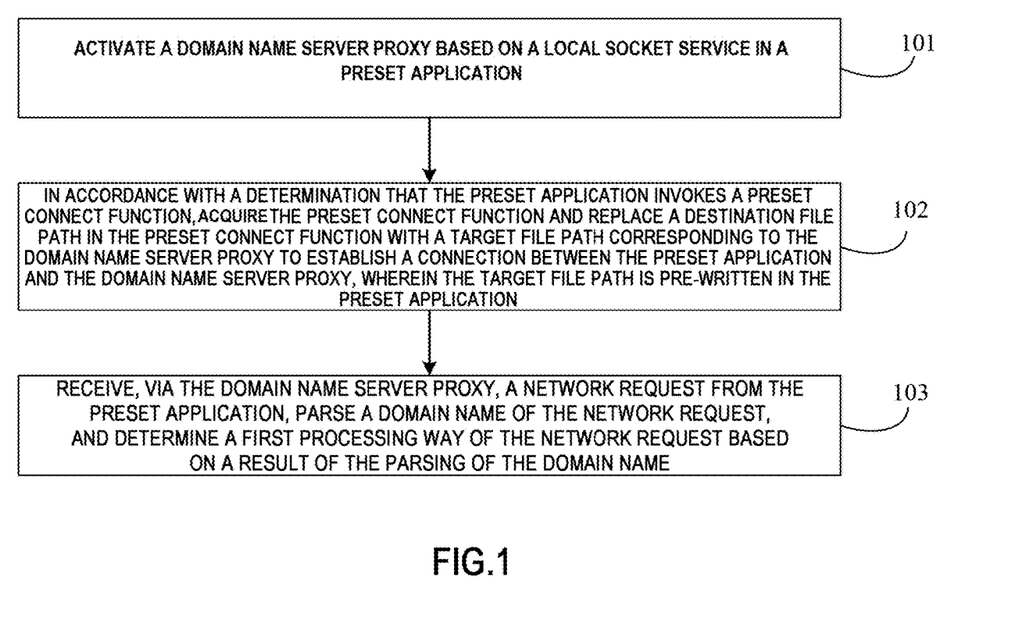
FIG. 1 shows a schematic flowchart of a method for processing a network request provided by embodiments of the present disclosure.

FIG. 1 is a flowchart of a method for processing a network request provided by an embodiment of the present disclosure. The method may be applicable to a preset application and may be performed by a processing a network request apparatus, wherein the apparatus may be implemented by software and/or hardware and generally implemented in an electronic device. The electronic device may be a mobile device such as a mobile phone, a smart watch, a tablet computer and a personal digital assistant; it may also be other devices such as a desktop computer.

As shown in FIG. 1, the method comprises:

at step 101, a domain name server proxy based on a local socket service is activated in the preset application.

As an example, the preset application may be any application having network accessing capabilities. The preset application is loaded in an operating system, and a specific type of the operating system is not limited, and for example, may include Unix, Linux, Apple (iOS, macOS or OS X) and Android, etc. For the convenience of explanation, Android will be taken as an example below.

As an example, the first step of an application to request a network is to parse the domain name, and all network requests will go through this step. In the operating system network framework, the client-server (C/S) structure is generally used for the parsing of the domain name. Taking Android as an example, during the parsing of the domain name, the client (referred to as the domain name client) is NetdClient which will be loaded into the application process, and the server-side (corresponding to the real domain name server below) is NetdServer, and the application invokes NetdClient through a socket, where the NetdClient is connected to NetdServer through a Unix domain socket, and the NetdServer invokes the system kernel to initiate a real network request. The socket is an application programming interface (API) for inter-process communication in a network environment, also called a socket interface, and is the underlying interface for network capabilities on many operating system platforms. The local socket, also called Unix domain socket, is used for communication between processes running on the same computer device.

In the embodiments of the present disclosure, the domain name server proxy may be understood as a proxy server for parsing of the domain name which is custom-implemented within the preset application, and the domain name server proxy based on a local socket service may be understood as a local socket server-side for parsing of the domain name. In the development stage of the preset application, related codes for implementing the domain name server proxy may be pre-written, including a target file path corresponding to the domain name server proxy.

As an example, after the preset application is activated, the domain name server proxy may be activated, and the domain name server proxy may be associated to the target file path. Specifically, after the preset application is activated, a target file is created, and the domain name server proxy based on a local socket service is activated. Parameters in the local socket include the target file, a path of the target file is the target file path (including a file descriptor of the target file) corresponding to the domain name server proxy, and the domain name server proxy is associated to the target file path by specifying the target file path or the file descriptor of the target file.

At step 102, in accordance with a determination that the preset application invokes a preset connect function, the preset connect function is acquired, and a destination file path in the preset connection function is replaced with a target file path corresponding to the domain name server proxy to establish a connection between the preset application and the domain name server proxy, wherein the target file path is written in the preset application in advance.

As an example, the application needs to use a socket when implementing the network capability, the implementation of the socket including a connect function, also called a connect method. As the implementation of the socket, the connect function may be used to establish a connection with the corresponding socket. When the connection action of the application to initiate the network request needs to invoke the socket, the connect function corresponding to the socket may be called.

As an example, a preset connect function may be understood as the connect function which is invoked when the connection action of the preset application to initiate the network request needs to parse the domain name, the connect function being used to connect the corresponding local socket and further establish a connection between the client and the server-side during the parsing of the domain name stage. In the preset connect function, the original connection path (i.e., the destination file path) is the file path (e.g., /dev/socket/dnsproxyd) corresponding to the real domain name server (such as the above NetdServer), and the real domain name server may be understood as the domain name server which needs to be connected when the preset application needs to perform the parsing of the domain name. In the embodiments of the present disclosure, the preset connect function is acquired, and the destination file path therein is replaced by the target file path corresponding to the custom domain name server proxy, so that the preset application (which may also be understood as the client of the parsing stage of the domain name loaded in the preset application process, such as the above NetdClient) may be connected to the target file path, i.e., establishes a connection with the custom domain name server proxy instead of being directly connected to the real domain name server (such as the above NetdServer).

At step 103, a network request from the preset application is received via the domain name server proxy, a domain name of the network request is parsed, and a first processing way of the network request is determined based on a result of the parsing of the domain name.

As an example, after the preset application being connected to the custom domain name server proxy, the network request is sent to the domain name server proxy, and the domain name server proxy parses the domain name of the request, acquires a result of the parsing of the domain name, and then determines how to process the network request based on the result of the parsing of the domain name, i.e., a first processing way of the network request is determined. The result of the parsing of the domain name may comprise an Internet Protocol (IP) address corresponding to the network request.

As an example, the first processing way of the network request may be determined based on a preset determining policy, wherein the preset determining policy may be set according to real business needs. For example, it may be judged whether the network request is an illegal request, such as cross-domain access or access-risky domain name. If the network request is an illegal request or a risky network request, it can be proxied or discarded. For another example, the result of the parsing of the domain name may be saved, so that when a network request for the same domain name is subsequently received, the result of the parsing of the domain name may be directly re-used to reduce the time consumption. Still for another example, the network request scheduling function may be performed to support multi-room disaster recovery. As an example, the first processing way may comprise forwarding, proxying, discarding, replacing, scheduling and saving the corresponding result of the parsing of the domain name.

According to the processing a network request method provided in the embodiments of the present disclosure, a domain name server proxy based on a local socket service is activated in the preset application; and in accordance with a determination that the preset application invokes a preset connect function, the preset connect function is acquired, and a destination file path in the preset connection function is replaced with a target file path corresponding to the domain name server proxy to establish a connection between the preset application and the domain name server proxy, wherein the target file path is written in the preset application in advance; and a network request from the preset application is received via the domain name server proxy, and a domain name of the network request is parsed, and a first processing way of the network request is determined based on a result of the parsing of the domain name. With the above technical solution, the domain name server proxy may be implemented inside the application, and all network requests may be taken over from the parsing of the domain name, which facilitates comprehensive detection and control of network traffic and avoidance of omissions.

In some embodiments, after determining the first processing way of the network request based on the result of the parsing of the domain name, there is further comprised: if the first processing way comprises forwarding, forwarding the network request to a corresponding real domain name server via the domain name server proxy based on the destination file path. An advantage is that in case it is determined the network request has not anomaly or requires no special processing, the network request may be forwarded to the real domain name server, so that the real domain name server invokes the system kernel to initiate a real network request in order to communicate with a remote server.

In some embodiments, after determining the first processing way of the network request based on the result of the parsing of the domain name, there is further comprised: if the first processing way comprises proxying or discarding, forbidding forwarding the network request to a corresponding real domain name server. An advantage is that in case it is determined the network request has anomaly or requires special processing, the network request is forbidden from being forwarded to the real domain name server, and in this way, the real domain name server cannot invoke the system kernel to initiate a real network request, thereby avoiding communication with a remote server and hedging against risks. As an example, proxying may be understood as performing further processing to the network request while forbidding the network request from being forwarded to the corresponding real domain name server, and the specific processing policy not being to be limited. As an example, discarding may be understood as forbidding the network request from being forwarded to the corresponding real domain name server without performing further processing thereto.

In some embodiments, after forwarding the network request to a corresponding real domain name server via the domain name server proxy based on the destination file path, there is further comprised: receiving response data returned by the real domain name server via the domain name server proxy, parsing the response data and determining a second processing way of the response data based on a result of the parsing; if the second processing way comprises forwarding, forwarding the response data to the preset application via the domain name server proxy. An advantage is that the response data returned by the real domain name server may be detected and controlled, and in case actual control policy needs are satisfied, the control of the network traffic is implemented by forwarding data to the preset application.

In some embodiments, there is further comprised: if the second processing way comprises proxying or discarding, forbidding the response data from being forwarded to the preset application. An advantage is that in case actual control policy needs are not satisfied, the control of the network traffic is performed by forbidding data from being forwarded to the preset application.

In some embodiments, before detecting that the preset application invokes a preset connect function, there is further comprised: loading a first core library in the preset application, wherein the first core library performs the centralized management of invoking of a preset socket by injecting a proxy connect function in the first core library to a second core library, the second core library comprising a preset connect function, the preset connect function being used to establish a connection with a local socket, the local socket being included in the present socket; injecting a custom connect function to the second kernel function based on a preset injection approach corresponding to the proxy connect function, and wherein the custom connect function is used to replace the destination file path in the preset connect function by the target file path corresponding to the domain name server proxy. In accordance with a determination that the preset application invokes a preset connect function, acquiring the preset connect function and replacing the destination file path in the preset connect function by the target file path corresponding to the domain name server proxy comprises: in accordance with a determination that the preset application invokes a preset connect function by the second core library, calling the custom connect function instead to replace a destination file path in the preset connect function by the target file path corresponding to the domain name server proxy. An advantage is that custom code does not need to be injected for each place where the preset connect function needs to be called to achieve the purpose of proxying, and the custom connect function is injected to the second core library by using a preset injection approach that can inject a proxy connect function to the second core library, so that the custom connect function can have the function of the proxy connect function to perform the centralized management of invoking of the preset connect function, i.e., through one injection of the custom connect function, the effect of batch injection of proxying codes corresponding to multiple preset connection functions can be implemented. Therefore, the injection efforts of the code for proxying the connect function can be reduced, and the stability and performance of the application can be guaranteed.

As an example, the core library is also called kernel library and may be understood as a library for providing basic functions in the operating system. The socket is implemented in the second core library, and in different operating systems, the second core library might have different names. Taking Android for example, the second core library may be a Bionic library. The first core library is a different core library than the second core library. Since sockets need to be called at many places, in order to facilitate the management, the first core library can aggregate sockets at the system level and proxy the real implementation of the socket in the second core library to the first core library. The first core library may inject its own implementation (may be called proxy connect function) of the socket into the second core library, so that when the connect function in the second core library is executed, the proxy connect function will first be executed, and further the centralized management of invoking of the socket is performed. In different operating systems, the second core library might have different names. Taking Android for example, the second core library may be a NetdClient library, and the corresponding library file may be a libnetd_client.so file. The preset application may proactively load the first core library after being activated, or may load the first core library in accordance with a determination that a load event of the first core library is triggered. Optionally, the second core library may be loaded at a time that is the same as or different from the first core library.

As an example, the preset injection approach corresponding to the proxy connect function may be understood as an injection method that can inject the proxy connect function to the second core library. The method may be written according to actual needs or re-use the injection method provided by the operating system. Optionally, the preset injection approach comprises a method for injecting the proxy connect function to the second core library as provided by the operating system.

Taking Android as an example, the preset injection approach comprises a NetdClientInitConnect approach. The method is exposed to the public by the Android operating system, and the preset application may acquire the method and further invoke the method.

As an example, the custom connect function is injected to the second core library by calling the preset injection approach.

In the embodiments of the present disclosure, the custom connect function may be pre-written during the development stage of the preset application, and the function of the custom connect function is to implement a custom logic. The custom logic may be understood as a logic required for proxying, with the specific content of replacing the destination file path in the preset connect function by the target file path corresponding to the domain name server proxy. The custom logic may exist in the custom connect function in the form of parameters, which can also be called custom parameters. Specifically, the custom parameters may be functions or related codes used to implement the custom logic.

Optionally, the custom connect function is injected in the form of a preset parameter. The preset parameter may be input when calling the preset injection approach, and the preset parameter may be understood as an object that needs to be injected. The custom connect function is used as the input object, i.e., the custom connect function is input to the preset injection approach, to implement the custom connect function to the second core library.

As an example, when the preset application initiates the connection action of the network request, the local socket needs to be called, so the preset connect function needs to be called by the second core library. Since the custom connect function has previously been injected to the second core library, the currently called original preset connect function will not directly be executed, but first the custom connection function is executed, and further the destination file path in the preset connect function is replaced by the target file path corresponding to the domain name server proxy.

In some embodiments, injecting the custom connect function to the second core library based on the preset injection approach corresponding to the proxy connect function comprises: using a preset dynamic library symbol function to look up an address of the preset injection approach corresponding to the proxy connect function; calling the preset injection approach based on the address of the preset injection approach, to inject the custom connect function to the second core library. An advantage is that the address of the preset injection approach provided by the operating system can be fast and accurately found and called.

The functionality of the dynamic library symbol (dlsym) function is to return an address corresponding to the symbol according to the dynamic link library operation handle and symbol. Not only a function address may be acquired, but also a variable address may be acquired. The preset dynamic library symbol function may be understood as a dlsym function which is pre-written during the development stage of the preset application and used for looking up the address of the preset injection approach, e.g., a dlsym function for looking up an address of the NetdClientInitConnect approach.

In some embodiments, after calling the custom connect function instead to replace the destination address of the preset connect function by the target address corresponding to the local server proxy, there is further comprised: executing a system call to the preset connect function. An advantage is that after the execution of the custom connection function being completed, the calling to the preset connection function again and the replacing by the execution of the custom connection function again may be prevented and the occurrence of infinite loop of proxy invoking may be avoided.

As an example, the system call (also called syscall) is the means for user space to access the kernel and is the legal entry to the kernel. In case the preset connect function is invoked normally, the relevant functions of the bottom layer of the system (also called the kernel layer) will be called by executing the corresponding system calls, and finally the function of the preset connect function will be implemented. In the embodiments of the present disclosure, after calling the custom connect function to implement the custom logic, the system call to the preset connect function is directly executed, instead of returning to invoke the preset connect function. Therefore, the occurrence of infinite loop may be avoided, and the normal running of the preset application may be guaranteed.

Figure 2:
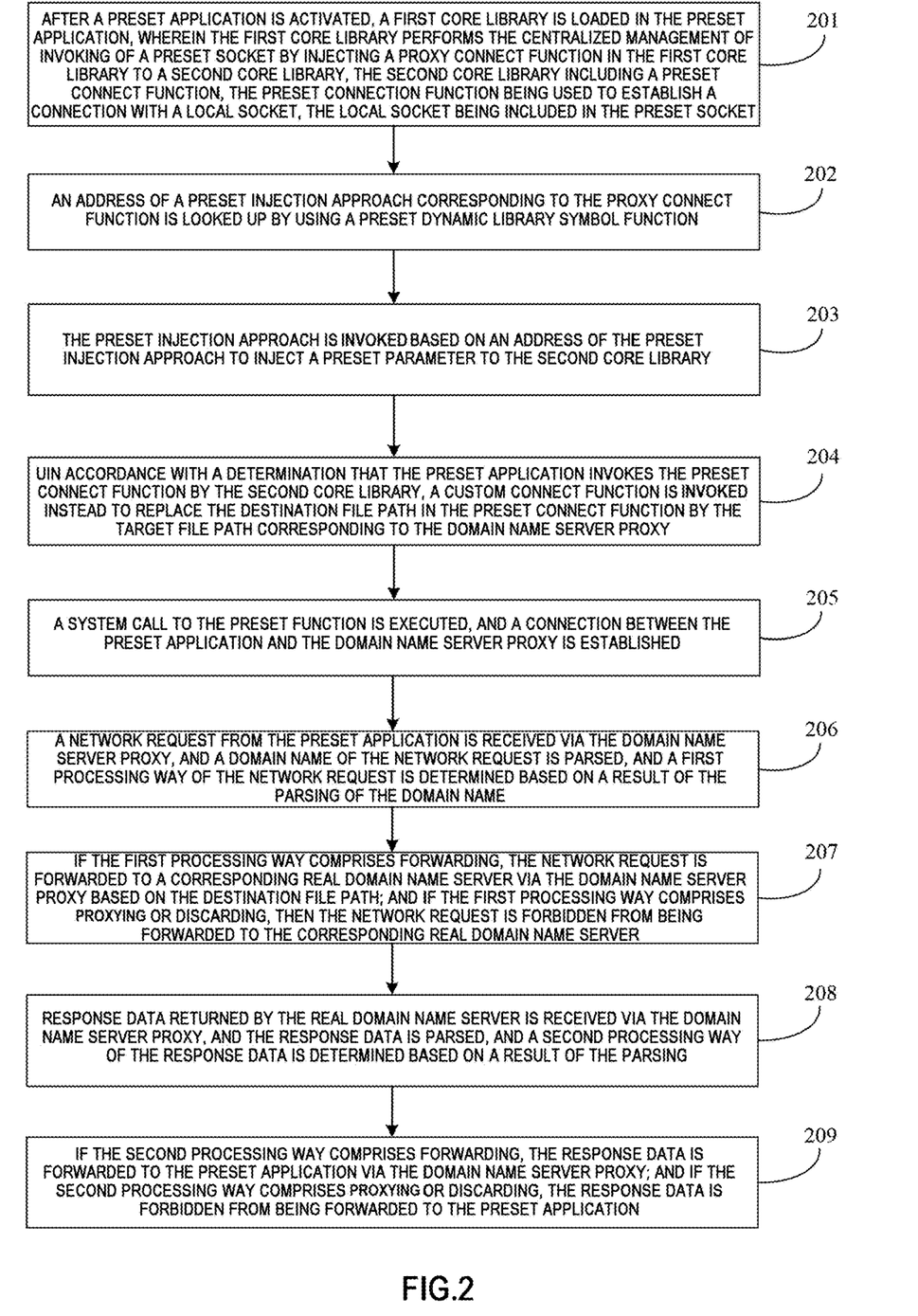
FIG. 2 shows a schematic flowchart of another method for processing a network request provided by embodiments of the present disclosure.
Figure 3:
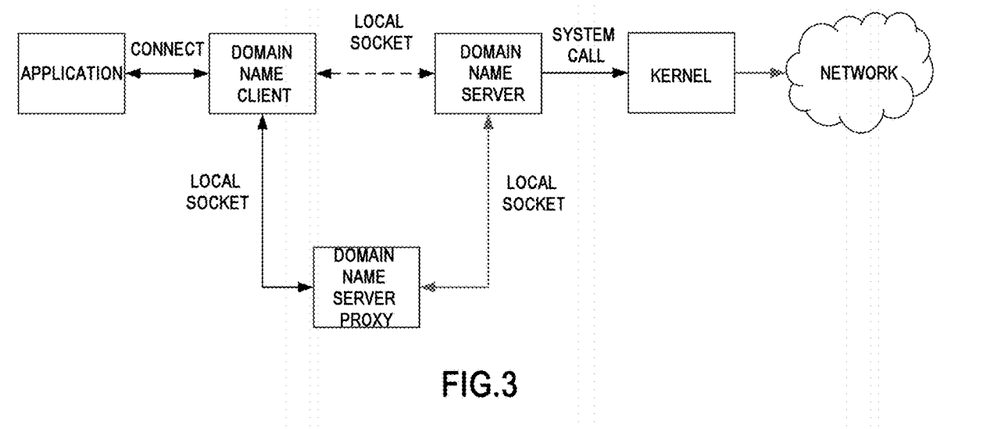
FIG. 3 shows a schematic diagram of the principle of a method for processing a network request provided by embodiments of the present disclosure.

FIG. 2 is a schematic flowchart of another method for processing a network request provided by an embodiment of the present disclosure, the embodiment being optimized based on various optional solutions in the above embodiment. FIG. 3 is a schematic diagram of the principle of a method for processing a network request provided by an embodiment of the present disclosure, and the embodiment may be understood in conjunction with FIGS. 2 and 3.

Specifically, taking the Android operating system as an example, the method comprises the following steps:

At step 201, after a preset application is activated, a first core library is loaded in the preset application, wherein the first core library performs the centralized management of invoking of a preset socket by injecting a proxy connect function in the first core library to a second core library, the second core library including a preset connect function, the preset connection function being used to establish a connection with a local socket, the local socket being included in the preset socket.

As an example, after the preset application is activated, a NetdClient library is proactively loaded, i.e., a libnetd_client.so file is loaded.

At step 202, an address of a preset injection approach corresponding to the proxy connect function is looked up by using a preset dynamic library symbol function.

As an example, a preset dlsym function may be pre-written in the development stage of the preset application, the preset application using the preset dlsym function to look up an address of a NetdClientInitConnect approach.

At step 203, the preset injection approach is invoked based on an address of the preset injection approach to inject a preset parameter to the second core library.

A custom connect function is injected in the form of the preset parameter, the custom connect function being used to replace a destination file path in the preset connect function with a target file path corresponding to a domain name server proxy.

As an example, the preset application may invoke the NetdClientInitConnect approach in the NetdClient library and input the custom connection function, and inject the custom connection function to a Bionic library.

At step 204, in accordance with a determination that the preset application invokes the preset connect function by the second core library, a custom connect function is invoked instead to replace the destination file path in the preset connect function by the target file path corresponding to the domain name server proxy.

As an example, when the preset application initiates a connection action of the network request, it may be detected that the preset application invokes the preset connect function in the Bionic library, at which point the custom connect function is invoked instead to implement a logic required by the proxy. For example, /dev/socket/dnsproxyd in the connect function is replaced by the target file path pre-written.

At step 205, a system call to the preset function is executed, and a connection between the preset application and the domain name server proxy is established.

At step 206, a network request from the preset application is received via the domain name server proxy, and a domain name of the network request is parsed, and a first processing way of the network request is determined based on a result of the parsing of the domain name.

As shown in FIG. 3, in the original solution, after a domain name client (NetdClient) being loaded to an application process, a connection between the application and the domain name client is implemented, and the application is connected by the domain name client to a domain name server (NetdServer) through a local socket (Unix domain socket) (as shown by dotted arrows in the figure). In the embodiment of the present disclosure, however, if the domain name client wants to be connected to the domain name server through the local socket, the destination file path in the called preset connect function is replaced, so that the domain name client is connected to the domain name server proxy corresponding to the replaced target file path, the domain name server proxy interacts with the domain name server through the local socket (as shown by solid arrows in the figure) and detects the network request during the interaction, to discovering anomaly or risks in time, thereby realizing a full control over the network traffic.

At step 207, if the first processing way comprises forwarding, the network request is forwarded to a corresponding real domain name server via the domain name server proxy based on the destination file path; and if the first processing way comprises proxying or discarding, then the network request is forbidden from being forwarded to the corresponding real domain name server.

At step 208, response data returned by the real domain name server is received via the domain name server proxy, and the response data is parsed, and a second processing way of the response data is determined based on a result of the parsing.

At step 209, if the second processing way comprises forwarding, the response data is forwarded to the preset application via the domain name server proxy; and if the second processing way comprises proxying or discarding, the response data is forbidden from being forwarded to the preset application.

With the method for processing a network request provided by the embodiments of the present disclosure, after the application is activated, the address of the NetdClientInitConnect approach in the NetdClient is looked up, and the custom connect function for realizing the logic for replacing the destination file path is injected to the Bionic library by calling the NetdClientInitConnect approach. In case subsequently the preset application initiates a connection action of the network request and needs to be connected to the real domain name server, while calling the original connect function in the Bionic library, the custom connect function is invoked instead, so that the destination file path is replaced and the connection between the preset application and the custom domain name server proxy is completed. In this way, the injection amounts of the code for proxying the connect function can be reduced, and the stability and performance of the application can be guaranteed. Moreover, all network requests are taken over from the parsing of the domain name and controlled according to actual business needs, and a network request that satisfies needs such as having no risk is forwarded, while a network request that does not satisfy needs such as having risks is proxied or discarded. In this way, the overall detection and control of the network traffic can be implemented, omissions can be avoided and the network security can be guaranteed.

Figure 4:
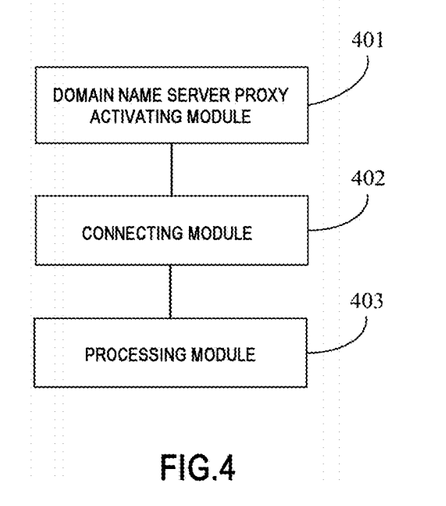
FIG. 4 shows a structural block diagram of an apparatus for processing a network request provided by embodiments of the present disclosure.

FIG. 4 is a schematic block diagram of an apparatus for processing a network request provided by an embodiment of the present disclosure, which may be configured in a preset application, implemented by software and/or hardware, generally integrated in an electronic device and perform the processing a network request by performing a method for processing a network request. As shown in FIG. 4, the apparatus comprises:

A domain name server proxy activating module 401, configured to activate a domain name server proxy based on a local socket service in a preset application.

A connecting module 402, configured to, in accordance with a determination that the preset application invokes a preset connect function, acquire the preset connect function and replace a destination file path in the preset connect function with a target file path corresponding to the domain name server proxy to establish a connection between the preset application and the domain name server proxy, wherein the target file path is pre-written in the preset application;

A processing module 403, configured to receive via the domain name server proxy a network request from the preset application and parse a domain name of the network request, and determine a first processing way of the network request based on a result of the parsing of the domain name.

With the apparatus for processing a network request provided by the embodiment of the present disclosure, the domain name server proxy may be implemented within the application, and all network requests may be taken over from the parsing of the domain name, which helps to perform an overall detection and control of the network traffic and avoid omissions.

Optionally, the apparatus further comprises: a first forwarding module, configured to, after determining the first processing way of the network request based on the result of the parsing of the domain name, forward the network request to a corresponding real domain name server via the domain name server proxy based on the destination file path, if the first processing way comprises forwarding.

Optionally, the apparatus further comprises: a first proxying module, configured to forbid forwarding the network request to a corresponding real domain name server, if the first processing way comprises proxying or discarding.

Optionally, the apparatus further comprises: a processing way determining module, configured to, after forwarding the network request to a corresponding real domain name server via the domain name server proxy based on the destination file path, receive via the domain name server proxy response data returned by the real domain name server, parse the response data and determine a second processing way of the response data based on a result of the parsing;

A second forwarding module, configured to forward the response data to the preset application via the domain name server proxy, if the second processing way comprises forwarding.

Optionally, the apparatus further comprises: a second proxying module, configured to forbid forwarding the response data to the preset application, if the second processing way comprises discarding.

Optionally, the apparatus further comprises: a loading module, configured to, before detecting that the preset application invokes a preset connect function, load a first core library in the preset application, wherein the first core library performs the centralized management of invoking of a preset socket by injecting a proxy connect function in the first core library to a second core library, the second core library comprising a preset connect function, the preset connect function being used to establish a connection with a local socket, the local socket being comprised in the preset socket;

An injecting module, configured to inject a custom connect function to the second core library based on a preset injection approach corresponding to the proxy connect function;

Wherein in accordance with a determination that the preset application invokes a preset connect function, acquiring the preset connect function and replacing a destination file path in the preset connect function by the target file path corresponding to the domain name server proxy comprises:

In accordance with a determination that the preset application invokes a preset connect function by the second core library, calling the custom connect function instead to replace a destination file path in the preset connect function by the target file path corresponding to the domain name server proxy.

Optionally, the preset injection approach comprises an approach provided by an operating system for injecting the proxy connect function in the first core library to the second core library.

Optionally, calling a preset injection approach corresponding to the proxy connect function based on a preset parameter to inject a custom connect function to the second core library comprises: using a preset dynamic library symbol function to look up an address of a preset injection approach corresponding to the proxy connect function; and calling the preset injection approach based on the address of the preset injection approach to inject a custom connect function to the second core library.

Optionally, the apparatus further comprises: a system call executing module, configured to invoke the custom connect function to execute a system call to the preset connect function after replacing a destination file path in the preset connect function with a target file path corresponding to the domain name server proxy.

Optionally, the operating system comprises an Android operating system, and the first core library comprises a NetdClient library, and the second core library comprise a Bionic library, and the preset injection approach comprises a NetdClientInitConnect approach, and the preset application invokes the preset connect function by NetdClient, and a real domain name server corresponding to the destination file path comprises NetdServer.

Figure 5:
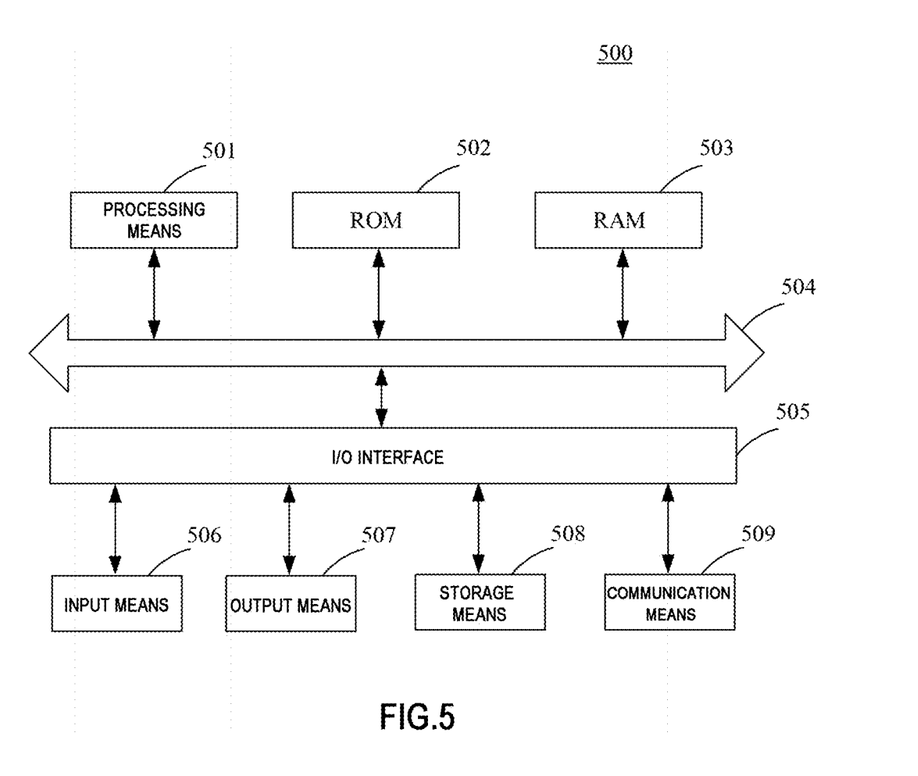
FIG. 5 shows a structural block diagram of an electronic device provided by embodiments of the present disclosure.

With reference to FIG. 5 below, the figure shows a schematic block diagram of an electronic device 500 suitable for implementing embodiments of the present disclosure. The electronic device in the embodiments of the present disclosure may include, without limitation to, a mobile terminal such as a mobile phone, a notebook computer, a digital broadcast receiver, PDA (personal digital assistant), PDA (tablet computer), PMP (portable multimedia player) and a vehicle terminal (e.g., a vehicle navigation terminal), and a fixed terminal such as a digital TV and a desktop computer. The electronic device shown in FIG. 5 is merely an example and not intended to limit the functionality and application scope of the embodiments of the present disclosure.

As shown in FIG. 5, the electronic device 500 may comprise processing means (e.g., a central processor, a graphics processor, etc.) 501 which is capable of performing various appropriate actions and processes in accordance with a program stored in a read only memory (ROM) 602 or a program loaded from storage means 508 to a random access memory (RAM) 503. In the RAM 503, there are also stored various programs and data required by the electronic device 500 when operating. The processing means 501, the ROM 502 and the RAM 503 are connected to one another via a bus 504. An input/output (I/O) interface 505 is also connected to the bus 504.

Usually, the following means are connected to the I/O interface 505: input means 506 including a touch screen, a touch tablet, a keyboard, a mouse, a camera, a microphone, an accelerometer, a gyroscope or the like; output means 507 including a liquid crystal display, a loudspeaker a vibrator or the like; storage means 508, including a magnetic tape, a hard disk or the like; and communication means 509. The communication means 509 allows the electronic device 500 to exchange information/data with other device in a wireless or wired way. Although FIG. 5 shows the electronic device 500 with various means, it should be understood that it does not require to implement or have all the shown means. Alternatively, more or less means may be implemented or comprised.

In particular, the procedures described with reference to the flowchart according to the embodiments of the present disclosure may be implemented as a computer software program. For example, the embodiments of the present disclosure comprise a computer program product, which comprises a computer program carried on a non-transient computer readable medium, the computer program containing program code for performing the method shown in the flowchart. In such an embodiment, the computer program may be downloaded from the network and installed via the communication means 509, or installed from the storage means 508, or installed from the ROM 502. The computer program, when executed by the processing means 501, may execute the above functions defined in the method according to the embodiments of the present disclosure.

It is noteworthy that the computer readable medium can be a computer readable signal medium or a computer readable storage medium or any combination thereof. The computer readable storage medium may be, for example, but is not limited to, an electronic, magnetic, optical, electromagnetic, infrared, semiconductor system, means or device, or any suitable combination of the foregoing. More specific examples of the computer readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, the computer readable storage medium may be any tangible medium containing or storing a program which may be used by an instruction executing system, apparatus or device or used in conjunction therewith. In the present disclosure, the computer readable signal medium may include a data signal propagated in baseband or as part of a carrier wave, with computer readable program code carried therein. The data signal propagated as such may take various forms, including without limitation to, an electromagnetic signal, an optical signal or any suitable combination of the foregoing. The computer readable signal medium may further be any other computer readable medium than the computer readable storage medium, which computer readable signal medium may send, propagate or transmit a program used by an instruction executing system, apparatus or device or used in conjunction with the foregoing. The program code included in the computer readable medium may be transmitted using any suitable medium, including without limitation to, an electrical wire, an optical fiber cable, RF (radio frequency), etc., or any suitable combination of the foregoing.

The above computer readable medium may be included in the above-mentioned electronic device; and it may also exist alone without being assembled into the electronic device.

The computer readable medium carries one or more programs which, when executed by the electronic device, cause the electronic device to: activate a domain name server proxy based on a local socket service in a preset application; in accordance with a determination that the preset application invokes a preset connect function, acquire the preset connect function and replace a destination file path in the preset connect function with a target file path corresponding to the domain name server proxy to establish a connection between the preset application and the domain name server proxy, wherein the target file path is pre-written in the preset application; receive via the domain name server proxy a network request from the preset application, and parse a domain name of the network request, and determine a first processing way of the network request based on a result of the parsing of the domain name.

Computer program codes for carrying out operations of the present disclosure may be written in one or more programming languages, including without limitation to, an object oriented programming language such as Java, Smalltalk, C++ or the like, and conventional procedural programming languages, such as the "C" programming language or similar programming languages. The program codes may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The modules described in the embodiments of the present disclosure may be implemented as software or hardware. Wherein the name of a module does not form any limitation to the module per se. For example, the domain name server proxy activating module may further be described as "a module activating a domain name server proxy based on a local socket service in the preset application."

The functions described above may be executed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In the context of the present disclosure, the machine readable medium may be a tangible medium, which may include or store a program used by an instruction executing system, apparatus or device or used in conjunction with the foregoing. The machine readable medium may be a machine readable signal medium or a machine readable storage medium. The machine readable medium may include, but is not limited to, an electronic, magnetic, optical, electromagnetic, infrared, semiconductor system, means or device, or any suitable combination of the foregoing. More specific examples of the machine readable storage medium include the following: an electric connection with one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

According to one or more embodiments of the present disclosure, there is provided a method for processing a network request, comprising: activating a domain name server proxy based on a local socket service in a preset application; in accordance with a determination that the preset application invokes a preset connect function, acquiring the preset connect function and replacing a destination file path in the preset connect function with a target file path corresponding to the domain name server proxy to establish a connection between the preset application and the domain name server proxy, wherein the target file path is pre-written in the preset application; receiving via the domain name server proxy a network request from the preset application, and parsing a domain name of the network request, and determining a first processing way of the network request based on a result of the parsing of the domain name.

Further, after determining the first processing way of the network request based on the result of the parsing of the domain name, further comprising: if the first processing way comprises forwarding, then forwarding the network request to a corresponding real domain name server via the domain name server proxy based on the destination file path.

Further, after determining the first processing way of the network request based on the result of the parsing of the domain name, further comprising: if the first processing way comprises proxying or discarding, forbidding forwarding the network request to a corresponding real domain name server.

Further, after forwarding the network request to a corresponding real domain name server via the domain name server proxy based on the destination file path, further comprising: receiving response data returned by the real domain name server via the domain name server proxy, parsing the response data and determining a second processing way of the response data based on a result of the parsing; if the second processing way comprises forwarding, forwarding the response data to the preset application via the domain name server proxy.

Further, before detecting that the preset application invokes a preset connect function, further comprising: loading a first core library in the preset application, where the first core library performs the centralized management of invoking of a preset socket by injecting a proxy connect function in the first core library to a second core library, the second core library comprising a preset connect function, the preset connect function being used to establish a connection with a local socket, the local socket being included in the present socket; injecting a custom connect function to the second kernel function based on a preset injection approach corresponding to the proxy connect function; where in accordance with a determination that the preset application invokes a preset connect function, the obtaining the preset connect function and replacing a destination file path in the preset connect function with a target file path corresponding to the domain name server proxy comprises: in accordance with a determination that the preset application invokes a preset connect function by the second core library, calling the custom connect function instead to replace a destination file path in the preset connect function by the target file path corresponding to the domain name server proxy.

Further, the preset injection approach comprises an approach provided by an operating system for injecting the proxy connect function in the first core library to the second core library; where the calling the preset injection approach corresponding to the proxy connect function based on a preset parameter to inject a custom connect function to the second core library comprises: using a preset dynamic library symbol function to look up an address of a preset injection approach corresponding to the proxy connect function; calling the preset injection approach based on the address of the preset injection approach to inject a custom connect function to the second core library.

Further, the operating system comprises an Android operating system, and the first core library comprises a NetdClient library, and the second core library comprises a Bionic library, and the preset injection approach comprises a NetdClientInitConnect approach, and the preset application invokes the preset connect function by NetdClient, and a real domain name server corresponding to the destination file path comprises NetdServer.

According to one or more embodiments of the present disclosure, there is provided an apparatus for processing a network request, comprising: a domain name server proxy activating module configured to activate a domain name server proxy based on a local socket service in a preset application; a connecting module configured to, in accordance with a determination that the preset application invokes a preset connect function, acquire the preset connect function and replace a destination file path in the preset connect function with a target file path corresponding to the domain name server proxy to establish a connection between the preset application and the domain name server proxy, wherein the target file path is pre-written in the preset application; a processing module configured to receive via the domain name server proxy a network request from the preset application, and parse a domain name of the network request, and determine a first processing way of the network request based on a result of the parsing of the domain name.

The foregoing description merely illustrates the preferable embodiments of the present disclosure and used technical principles. Those skilled in the art should understand that the scope of the present disclosure is not limited to technical solutions formed by specific combinations of the foregoing technical features and also cover other technical solution formed by any combinations of the foregoing or equivalent features without departing from the concept of the present disclosure, such as a technical solution formed by replacing the foregoing features with the technical features disclosed in the present disclosure (but not limited to) with similar functions.

In addition, although various operations are depicted in a particular order, this should not be construed as requiring that these operations be performed in the particular order shown or in a sequential order. In a given environment, multitasking and parallel processing may be advantageous. Likewise, although the above discussion contains several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or method logical acts, it is to be understood that the subject matter defined in the appended claims is not necessarily limited to the specific features or acts described above. On the contrary, the specific features and acts described above are merely example forms of implementing the claims.

I claim:

1. A method for processing a network request, comprising:
    activating a domain name server proxy based on a local socket service in a preset application;
    in accordance with a determination that the preset application invokes a preset connect function, acquiring the preset connect function and replacing a destination file path in the preset connect function with a target file path corresponding to the domain name server proxy to establish a connection between the preset application and the domain name server proxy, wherein the target file path is pre-written in the preset application;
    receiving, via the domain name server proxy, a network request from the preset application, parsing a domain name of the network request, and determining a first processing way of the network request based on a result of the parsing of the domain name;
    the method further comprising: before detecting that the preset application invokes a preset connect function,
    loading a first core library in the preset application, wherein the first core library performs the centralized management of invoking of a preset socket by injecting a proxy connect function in the first core library to a second core library, the second core library comprising a preset connect function, the preset connect function being used to establish a connection with a local socket, the local socket being included in the present socket; and
    injecting a custom connect function to the second core library based on a preset injection approach corresponding to the proxy connect function.

2. The method according to claim 1, further comprising: after determining the first processing way of the network request based on the result of the parsing of the domain name,
    in response to the first processing way comprising forwarding, forwarding the network request to a corresponding real domain name server via the domain name server proxy based on the destination file path.

3. The method according to claim 2, further comprising: after forwarding the network request to the corresponding real domain name server via the domain name server proxy based on the destination file path,
    receiving response data returned by the real domain name server via the domain name server proxy, parsing the response data, and determining a second processing way of the response data based on a result of the parsing;
    in response to the second processing way comprising forwarding, forwarding the response data to the preset application via the domain name server proxy.

4. The method according to claim 1, further comprising: after determining the first processing way of the network request based on the result of the parsing of the domain name,
    in response to the first processing way comprising proxying or discarding, forbidding forwarding the network request to a corresponding real domain name server.

5. The method according to claim 1,
    wherein in accordance with a determination that the preset application invokes the preset connect function, acquiring the preset connect function and replacing the destination file path in the preset connect function by the target file path corresponding to the domain name server proxy comprises:
    in accordance with a determination that the preset application invokes a preset connect function by the second core library, calling the custom connect function instead, to replace a destination file path in the preset connect function by the target file path corresponding to the domain name server proxy.

6. The method according to claim 5, wherein the preset injection approach comprises an approach provided by an operating system for injecting the proxy connect function to the second core library;
    wherein the calling the preset injection approach corresponding to the proxy connect function based on the preset parameter to inject the custom connect function to the second core library comprises:
    using a preset dynamic library symbol function to look up an address of the preset injection approach corresponding to the proxy connect function;
    calling the preset injection approach based on the address of the preset injection approach to inject a custom connect function to the second core library.

7. The method according to claim 5, characterized in that the operating system comprises an Android operating system, and the first core library comprises a NetdClient library, and the second core library comprises a Bionic library, and the preset injection approach comprises a NetdClientInitConnect approach, and the preset application invokes the preset connect function by NetdClient, and a real domain name server corresponding to the destination file path comprises NetdServer.

8. An electronic device, comprising: a memory, a processor and a computer program stored on the memory and capable of running on the processor, characterized in that wherein the processor is configured to:
    activate a domain name server proxy based on a local socket service in a preset application;
    in accordance with a determination that the preset application invokes a preset connect function, acquire the preset connect function and replace a destination file path in the preset connect function with a target file path corresponding to the domain name server proxy to establish a connection between the preset application and the domain name server proxy, wherein the target file path is pre-written in the preset application;
    receive, via the domain name server proxy, a network request from the preset application, parse a domain name of the network request, and determine a first processing way of the network request based on a result of the parsing of the domain name;

the processor is further configured to: before detecting that the preset application invokes a preset connect function, load a first core library in the preset application, wherein the first core library performs the centralized management of invoking of a preset socket by injecting a proxy connect function in the first core library to a second core library, the second core library comprising a preset connect function, the preset connect function being used to establish a connection with a local socket, the local socket being included in the present socket; and inject a custom connect function to the second core library based on a preset injection approach corresponding to the proxy connect function.

9. The electronic device according to claim 8, wherein the processor is further configured to: after determining the first processing way of the network request based on the result of the parsing of the domain name, in response to the first processing way comprising forwarding, forward the network request to a corresponding real domain name server via the domain name server proxy based on the destination file path.

10. The electronic device according to claim 9, wherein the processor is further configured to: after forwarding the network request to the corresponding real domain name server via the domain name server proxy based on the destination file path, receive response data returned by the real domain name server via the domain name server proxy, parse the response data, and determine a second processing way of the response data based on a result of the parsing;

in response to the second processing way comprising forwarding, forward the response data to the preset application via the domain name server proxy.

11. The electronic device according to claim 8, wherein the processor is further configured to: after determining the first processing way of the network request based on the result of the parsing of the domain name, in response to the first processing way comprising proxying or discarding, forbid forwarding the network request to a corresponding real domain name server.

12. The electronic device according to claim 8, wherein the processor is configured to: in accordance with a determination that the preset application invokes the preset connect function, acquire the preset connect function and replace the destination file path in the preset connect function by the target file path corresponding to the domain name server proxy in the following manner:

in accordance with a determination that the preset application invokes a preset connect function by the second core library, calling the custom connect function instead, to replace a destination file path in the preset connect function by the target file path corresponding to the domain name server proxy.

13. The electronic device according to claim 12, wherein the preset injection approach comprises an approach provided by an operating system for injecting the proxy connect function to the second core library;

wherein the calling the preset injection approach corresponding to the proxy connect function based on the preset parameter to inject the custom connect function to the second core library comprises:

using a preset dynamic library symbol function to look up an address of the preset injection approach corresponding to the proxy connect function;

calling the preset injection approach based on the address of the preset injection approach to inject a custom connect function to the second core library.

14. The electronic device according to claim 12, wherein the operating system comprises an Android operating system, and the first core library comprises a NetdClient library, and the second core library comprises a Bionic library, and the preset injection approach comprises a NetdClientInit-Connect approach, and the preset application invokes the preset connect function by NetdClient, and a real domain name server corresponding to the destination file path comprises NetdServer.

15. A non-transitory computer readable storage medium, with a computer program stored thereon, characterized in that the program, when executed by a processor, causes the processor to perform:

activating a domain name server proxy based on a local socket service in a preset application;

in accordance with a determination that the preset application invokes a preset connect function, acquiring the preset connect function and replacing a destination file path in the preset connect function with a target file path corresponding to the domain name server proxy to establish a connection between the preset application and the domain name server proxy, wherein the target file path is pre-written in the preset application;

receiving, via the domain name server proxy, a network request from the preset application, parsing a domain name of the network request, and determining a first processing way of the network request based on a result of the parsing of the domain name;

the program further causes the processor to perform: before detecting that the preset application invokes a preset connect function, loading a first core library in the preset application, wherein the first core library performs the centralized management of invoking of a preset socket by injecting a proxy connect function in the first core library to a second core library, the second core library comprising a preset connect function, the preset connect function being used to establish a connection with a local socket, the local socket being included in the present socket; and injecting a custom connect function to the second core library based on a preset injection approach corresponding to the proxy connect function.

16. The non-transitory computer readable storage medium according to claim 15, wherein the program further causes the processor to perform: after determining the first processing way of the network request based on the result of the parsing of the domain name, in response to the first processing way comprising forwarding, forwarding the network request to a corresponding real domain name server via the domain name server proxy based on the destination file path.

17. The non-transitory computer readable storage medium according to claim 16, wherein the program further causes the processor to perform: after forwarding the network request to the corresponding real domain name server via the domain name server proxy based on the destination file path, receiving response data returned by the real domain name server via the domain name server proxy, parsing the response data, and determining a second processing way of the response data based on a result of the parsing;

in response to the second processing way comprising forwarding, forwarding the response data to the preset application via the domain name server proxy.

18. The non-transitory computer readable storage medium according to claim 15, wherein the program further causes the processor to perform: after determining the first processing way of the network request based on the result of the parsing of the domain name,
- in response to the first processing way comprising proxying or discarding, forbidding forwarding the network request to a corresponding real domain name server.

19. The non-transitory computer readable storage medium according to claim 15, wherein in accordance with a determination that the preset application invokes the preset connect function, acquiring the preset connect function and replacing the destination file path in the preset connect function by the target file path corresponding to the domain name server proxy comprises:
- in accordance with a determination that the preset application invokes a preset connect function by the second core library, calling the custom connect function instead, to replace a destination file path in the preset connect function by the target file path corresponding to the domain name server proxy.

20. The non-transitory computer readable storage medium according to claim 19, wherein the preset injection approach comprises an approach provided by an operating system for injecting the proxy connect function to the second core library;
- wherein the calling the preset injection approach corresponding to the proxy connect function based on the preset parameter to inject the custom connect function to the second core library comprises:
- using a preset dynamic library symbol function to look up an address of the preset injection approach corresponding to the proxy connect function;
- calling the preset injection approach based on the address of the preset injection approach to inject a custom connect function to the second core library.

* * * * *